US009677443B2

(12) United States Patent
Cho et al.

(10) Patent No.: US 9,677,443 B2
(45) Date of Patent: Jun. 13, 2017

(54) METHOD AND SYSTEM OF DETERMINING SUITABILITY OF CORRECTION FOR CONTROL LOGIC OF SELECTIVE CATALYTIC REDUCTION CATALYST

(71) Applicants: Hyundai Motor Company, Seoul (KR); FEV GMBH, Aachen (DE)

(72) Inventors: Ji Ho Cho, Yongin-si (KR); Jin Ha Lee, Seoul (KR); Bastian Holderbaum, Aachen (DE); Bernhard Lüers, Aachen (DE); Alexander Vovk, Aachen (DE)

(73) Assignees: Hyundai Motor Company, Seoul (KR); FEV GMBH, Aachen (DE)

( * ) Notice: Subject to any disclaimer, the term of this patent is extended or adjusted under 35 U.S.C. 154(b) by 165 days.

(21) Appl. No.: 14/473,774

(22) Filed: Aug. 29, 2014

(65) Prior Publication Data

US 2015/0176457 A1 Jun. 25, 2015

(30) Foreign Application Priority Data

Dec. 23, 2013 (KR) .................. 10-2013-0161451

(51) Int. Cl.
*F01N 3/20* (2006.01)
*F02D 41/14* (2006.01)
(Continued)

(52) U.S. Cl.
CPC ......... *F01N 3/208* (2013.01); *F02D 41/1402* (2013.01); *F02D 41/1441* (2013.01); *F02D 41/1461* (2013.01); *F02D 41/1463* (2013.01); *F02D 41/1465* (2013.01); *F01N 2560/026* (2013.01); *F01N 2560/14* (2013.01);
(Continued)

(58) Field of Classification Search
CPC ......... Y02T 10/47; Y02T 10/24; Y02T 10/20; F01N 3/208; F01N 2560/026; F01N 2610/02; F01N 2900/1402; F01N 2900/1622; F01N 11/00; F01N 9/005; B01D 53/9495; F02D 41/1402; F02D 41/1441; F02D 41/1461; F02D 41/1463; F02D 41/1465
See application file for complete search history.

(56) References Cited

U.S. PATENT DOCUMENTS

2008/0306673 A1* 12/2008 Yasui .................. F01N 3/208
701/102
2009/0301066 A1* 12/2009 Sindano ................ F01N 3/208
60/286
(Continued)

FOREIGN PATENT DOCUMENTS

JP 2011-220232 A 11/2011
JP 2014-098359 A 5/2014

*Primary Examiner* — Sizo Vilakazi
(74) *Attorney, Agent, or Firm* — Morgan Lewis & Bockius LLP

(57) ABSTRACT

A method of determining suitability of correction for a control logic of a selective catalytic reduction (SCR) catalyst, may include determining a suitability function of the correction based on a previous error and a current error when the correction has been performed, determining a suitability coefficient based on the suitability function of the correction, determining whether the correction may be suitable based on the number of corrections and the suitability coefficient, and resetting the control logic when the correction may be not suitable.

12 Claims, 5 Drawing Sheets

(51) Int. Cl.
*F02D 41/02* (2006.01)
*F02D 41/18* (2006.01)

(52) U.S. Cl.
CPC .............. *F01N 2610/146* (2013.01); *F01N 2900/0402* (2013.01); *F01N 2900/0408* (2013.01); *F01N 2900/0411* (2013.01); *F01N 2900/0416* (2013.01); *F02D 41/0235* (2013.01); *F02D 41/1445* (2013.01); *F02D 41/18* (2013.01); *F02D 2041/1412* (2013.01); *F02D 2041/1433* (2013.01); *F02D 2200/0802* (2013.01); *Y02T 10/24* (2013.01)

(56) References Cited

U.S. PATENT DOCUMENTS

| | | | | |
|---|---|---|---|---|
| 2011/0094209 | A1* | 4/2011 | Charial | F01N 3/208 60/287 |
| 2013/0047589 | A1* | 2/2013 | Bisaiji | F02D 41/0275 60/301 |
| 2015/0176456 | A1* | 6/2015 | Cho | F01N 3/208 60/274 |
| 2015/0177746 | A1* | 6/2015 | Cho | G05B 15/02 700/266 |

* cited by examiner

METHOD AND SYSTEM OF DETERMINING SUITABILITY OF CORRECTION FOR CONTROL LOGIC OF SELECTIVE CATALYTIC REDUCTION CATALYST

CROSS-REFERENCE TO RELATED APPLICATION

The present application claims priority to and the benefit of Korean Patent Application No. 10-2013-0161451 filed on Dec. 23, 2013, the entire contents of which is incorporated herein for all purposes by this reference.

BACKGROUND OF THE INVENTION

Field of the Invention

The present invention relates to a method and a system of determining suitability of correction for a control logic of a selective catalytic reduction (SCR) catalyst, and more particularly, to a method and a system of determining suitability of correction for a control logic of an SCR catalyst that secures reliability of correction executed on the control logic controlling operation of the SCR catalyst.

Description of Related Art

Generally, exhaust gas flowing out from an engine through an exhaust manifold is urged into a catalytic converter mounted at an exhaust pipe and is purified therein. After that, the noise of the exhaust gas is decreased while passing through a muffler and the exhaust gas is then emitted into the air through a tail pipe. The catalytic converter purifies pollutants contained in the exhaust gas. In addition, a particulate filter for trapping particulate matter (PM) contained in the exhaust gas is mounted in the exhaust pipe.

A selective catalytic reduction (SCR) catalyst is one type of such a catalytic converter.

Reducing agent such as urea, ammonia, carbon monoxide and hydrocarbon (HC) reacts better with nitrogen oxide than with oxygen in the SCR catalyst.

An exhaust system of a vehicle provided with the SCR catalyst includes an urea tank and dosing module. The dosing module injects reducing agent such as urea into the exhaust gas passing through the exhaust pipe, and thereby the SCR catalyst purifies the nitrogen oxide efficiently.

The reducing agent injected from the dosing module is absorbed in the SCR catalyst, is released when the exhaust gas containing the nitrogen oxide passes through the SCR catalyst, and reacts with the nitrogen oxide. when excessive reducing agent is injected from the dosing module, a portion of the reducing agent is not absorbed in the SCR catalyst and is slipped. Ammonia is typically used as the reducing agent of the SCR catalyst. When the ammonia is slipped from the SCR catalyst, the slipped ammonia may cause stink and customers may have complaints. When the dosing module injects the reducing agent insufficiently, the nitrogen oxide contained in the exhaust gas cannot be sufficiently removed and is exhausted to the exterior of the vehicle. Therefore, amount of the reducing agent injected from the dosing module should be precisely controlled.

In a conventional method of determining the amount of the reducing agent, the amount of the reducing agent according to driving conditions is stored in a map through experiments and the amount of the reducing agent according to current driving condition is determined from the map. However, since there are a millions of driving conditions affecting the amount of the reducing agent, manufacturing the map is a tedious and expensive process.

In addition, since the driving condition changes very quickly, a measuring apparatus has error, and experiments cannot be conducted under all the driving conditions when manufacturing the map, the map itself has error. In order to reduce the errors, the map is corrected. However, it is very difficult to get over innate limitations such as error of the measuring apparatus and quick change of the driving condition. Particularly, in a case that a vehicle runs on a road, a specific driving condition maintains for a very short time and an error determined under the specific driving condition does not necessarily reflect actual characteristics of the SCR catalyst.

Meanwhile, an error may not converge but diverges in a specific system when a control logic is corrected. In addition, a converging speed of the error may be very slow. In this case, resetting and newly correcting the control logic may be better than correcting the previously corrected control logic.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system of determining suitability of correction for a control logic of an SCR catalyst having advantages of determining whether correction is suitable and returning parameters of the control logic to default values when the correction is not suitable.

In an aspect of the present invention, a method of determining suitability of correction for a control logic of a selective catalytic reduction (SCR) catalyst, may include determining a suitability function of the correction based on a previous error and a current error when the correction may have been performed, determining a suitability coefficient based on the suitability function of the correction, determining whether the correction is suitable based on the number of corrections and the suitability coefficient, and resetting the control logic when the correction is not suitable.

The determining whether the correction is suitable is performed when the number of corrections is greater than a reference number of times.

The correction is suitable when a difference between the number of corrections and the suitability coefficient is greater than a reference deviation.

The suitability function of the correction is a value between −1 and 1.

The suitability coefficient is determined by adding the suitability function of the correction into a previous suitability coefficient.

When the correction is suitable, further comprising storing the current error.

In another aspect of the present invention, a system of determining suitability of correction for a control logic of a selective catalytic reduction (SCR) catalyst, may include the control logic determining injection amount of reducing agent for the SCR catalyst, and a controller controlling injection of the reducing agent according to the injection amount of the reducing agent at the least, wherein the controller is adapted to determine a suitability function of the correction based on a previous error and a current error when the correction may have been performed, to determine a suitability coefficient based on the suitability function of the correction, to determine whether the correction is suitable based on the number of corrections and the suitability coefficient, and to reset the control logic when the correction is not suitable.

The controller is adapted to determine whether the correction is suitable when the number of corrections is greater than a reference number of times.

The controller is adapted to determine that the correction is suitable when a difference between the number of correction and the suitability coefficient is greater than a reference deviation.

The suitability function of the correction is a value between −1 and 1.

The suitability coefficient is determined by adding the suitability function of the correction into a previous suitability coefficient.

The controller is adapted to store the current error when the correction is suitable.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
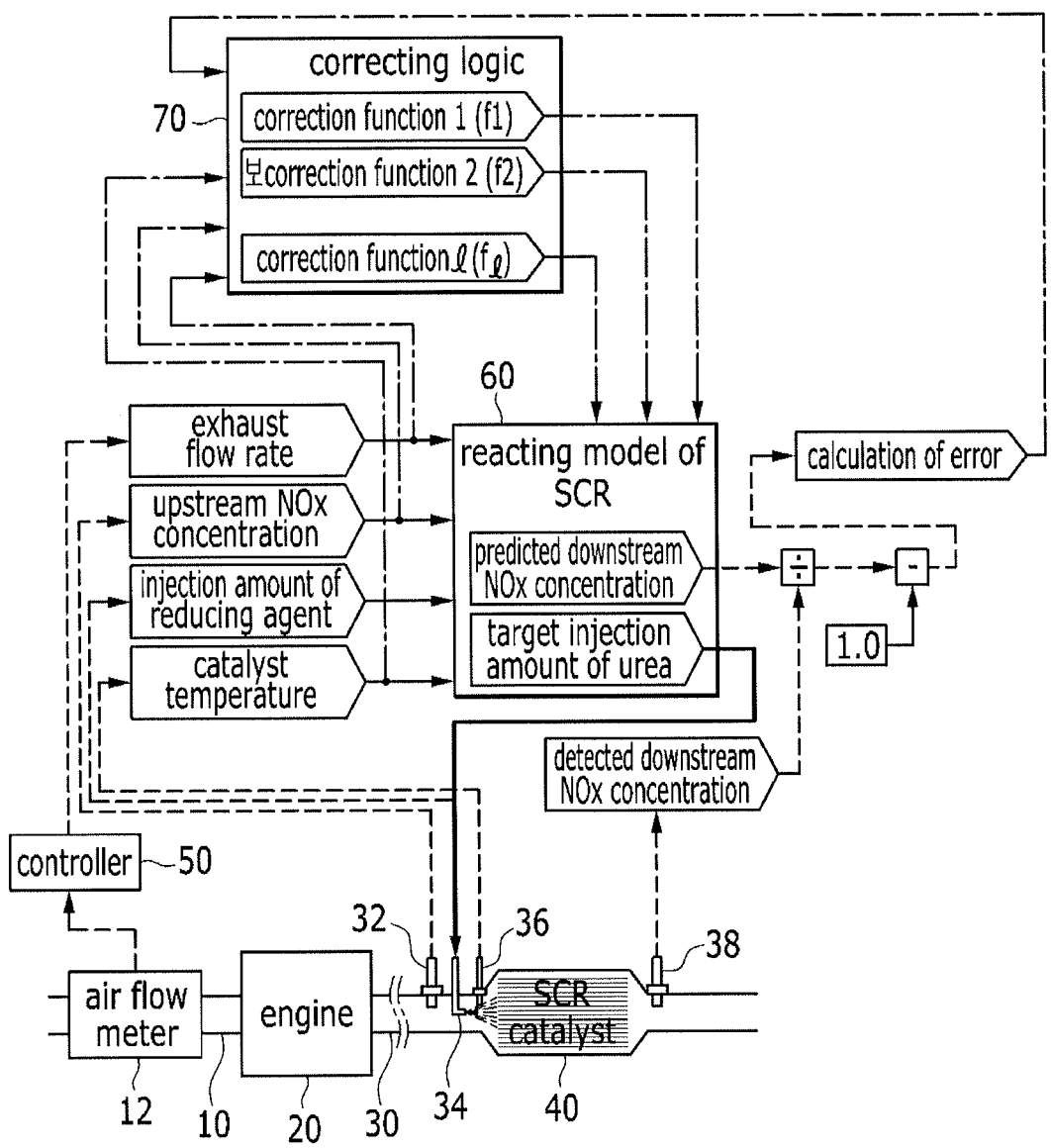
FIG. 1 is a schematic diagram of an exemplary exhaust system to which a system of determining suitability of correction for a control logic of an SCR catalyst according to an exemplary embodiment of the present invention can be applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an exemplary exhaust system to which a system of determining suitability of correction for a control logic of an SCR catalyst according to an exemplary embodiment of the present invention can be applied.

As shown in FIG. 1, nitrogen oxide in exhaust gas is removed while the exhaust gas generated in an engine 20 passes through a selective catalytic reduction (SCR) catalyst 40. If necessary, a particulate filter for trapping particulate matter contained in the exhaust gas and/or an oxidation catalyst for oxidizing carbon monoxide or hydrocarbon contained in the exhaust gas may be used. The exhaust system illustrated in FIG. 1 shows a simplified layout of an exhaust system to which spirit of the present invention can be applied, and it is to be understood that a range of the present invention is not limited to the exhaust system illustrated in FIG. 1.

The engine 20 burns air/fuel mixture in which fuel and air are mixed to convert chemical energy into mechanical energy. The engine 20 is connected to an intake manifold to receive the air in a combustion chamber, and is connected to an exhaust manifold such that the exhaust gas generated in combustion process is gathered in the exhaust manifold and is exhausted to the exterior. An injector is mounted in the combustion chamber to inject the fuel into the combustion chamber.

An intake pipe 10 is connected to the intake manifold of the engine 20 and is adapted to supply the air to the engine 20. An air flow meter 12 is mounted on the intake pipe 10 and detects flow rate of the air passing through the intake pipe 10.

An exhaust pipe 30 is connected to the exhaust manifold and is adapted to discharge the exhaust gas to the exterior of a vehicle.

The SCR catalyst 40 is mounted on the exhaust pipe 30 and is adapted to reduce the nitrogen oxide contained in the exhaust gas into nitrogen gas using reducing agent.

For these purposes, the exhaust system further includes a urea tank, a urea pump and a dosing module 34. For brief description, the urea tank and the urea pump are not illustrated in the drawings. In addition, urea is injected by the dosing module 34 in this specification but it is not limited that the dosing module 34 just injects the urea. That is, the dosing module 34 may inject ammonia. Furthermore, reducing agent other than the ammonia can be injected together with the ammonia or by itself.

The dosing module 34 injects the urea pumped by the urea pump into the exhaust pipe 30. The dosing module 34 is mounted on the exhaust pipe 30 between the engine 20 and the SCR catalyst 40 and injects the urea into the exhaust gas before entering the SCR catalyst 40. The urea injected into the exhaust gas is decomposed into the ammonia and the decomposed ammonia is used as the reducing agent for the nitrogen oxide. It is to be understood in this specification and claims that the reducing agent injected by the dosing module 34 includes materials that will be the reducing agent.

Meanwhile, the urea tank, the urea pump and the dosing module described in this specification are examples of reducing agent supplying devices, and it is to be understood that a range of the present invention is not limited to the examples of the reducing agent supplying devices. That is, other types of the reducing agent supplying devices can be used in an exemplary embodiment of the present invention.

The exhaust system further includes a plurality of sensors including a first NOx sensor 32, a temperature sensor 36 and second NOx sensor 38.

The first NOx sensor 32 is mounted on the exhaust pipe 30 upstream of the SCR catalyst 40 and detects NOx concentration contained in the exhaust gas at an upstream of the SCR catalyst. In various exemplary embodiments, the NOx concentration at the upstream of the SCR catalyst 40 may be predicted based on exhaust flow rate, operation history of the engine, temperature of the SCR catalyst 40, injection amount of the reducing agent and/or amount of the reducing agent absorbed in the SCR catalyst 40, instead of using the first NOx sensor 32.

The temperature sensor 36 is mounted on the exhaust pipe 30 upstream of the SCR catalyst 40 or in the SCR catalyst 40, and detects the temperature of the exhaust gas at the upstream of the SCR catalyst 40 or in the SCR catalyst 40. For better comprehension and ease of description, the temperature of the SCR catalyst 40 described in this specification and claim may be temperature of the exhaust gas at the upstream of the SCR catalyst 40 or temperature of the exhaust gas in the SCR catalyst 40.

The second NOx sensor 38 is mounted on the exhaust pipe 30 downstream of the SCR catalyst 40 and detects the NOx concentration contained in the exhaust gas at a downstream of the SCR catalyst 40.

The exhaust system further includes a controller 50. The controller 50 controls operation of the injector and the dosing module 34 based on the detection of the first and second NOx sensors 32 and 38 and the temperature sensor 36.

The controller 50 may determine exhaust flow rate based on flow rate of the air passing through the intake pipe 10.

The controller 50 further includes a reacting model 60 of the SCR catalyst 40 for predicting reaction of the SCR catalyst 40. The reacting model 60 is defined by m parameters. Herein, m is a natural number. For example, the parameters may includes parameter related to speed of purifying the NOx, parameters related to speed of oxidizing the ammonia, parameters related absorbed amount of the ammonia, and so on. In addition, the reacting model 60 is adapted to predict the NOx concentration contained in the exhaust gas at the downstream of the SCR catalyst 40 and determine target injection amount of the reducing agent (i.e., target injection amount of the urea) at the least. An error may be determined by comparing the predicted NOx concentration with the NOx concentration detected by the second NOx sensor 38. In addition, the reacting model 60 has n input variables. Herein, n is a natural number that is smaller than m. The input variables may include, but not limited to, the exhaust flow rate, the NOx concentration contained in the exhaust gas at the upstream of the SCR catalyst 40, the injection amount of the reducing agent and the temperature of the SCR catalyst 40.

It is exemplified in this specification that the reaction model 60 is used as a control logic for controlling operation of the SCR catalyst 40. The control logic may be any one of various control logics such as a control logic which determines the injection amount of the reducing agent by using a map and a control logic which determines the injection amount of the reducing agent by using specific variables. That is, since the spirit of the present invention can be applied to all the control logics for controlling operation of the SCR catalyst 40, it is to be understood that all the control logics for controlling operation of the SCR catalyst 40 is included within the scope of the present invention.

The controller 50 further includes a correcting logic 70 for correcting the parameters using the error. The correcting logic 70 may include at least one correction function f1, f2, . . . , and fl. The correcting logic 70 is adapted to determine a correction coefficient using the input variables and the error. The controller 50 corrects the parameters according to the correction coefficient.

Figure 2:
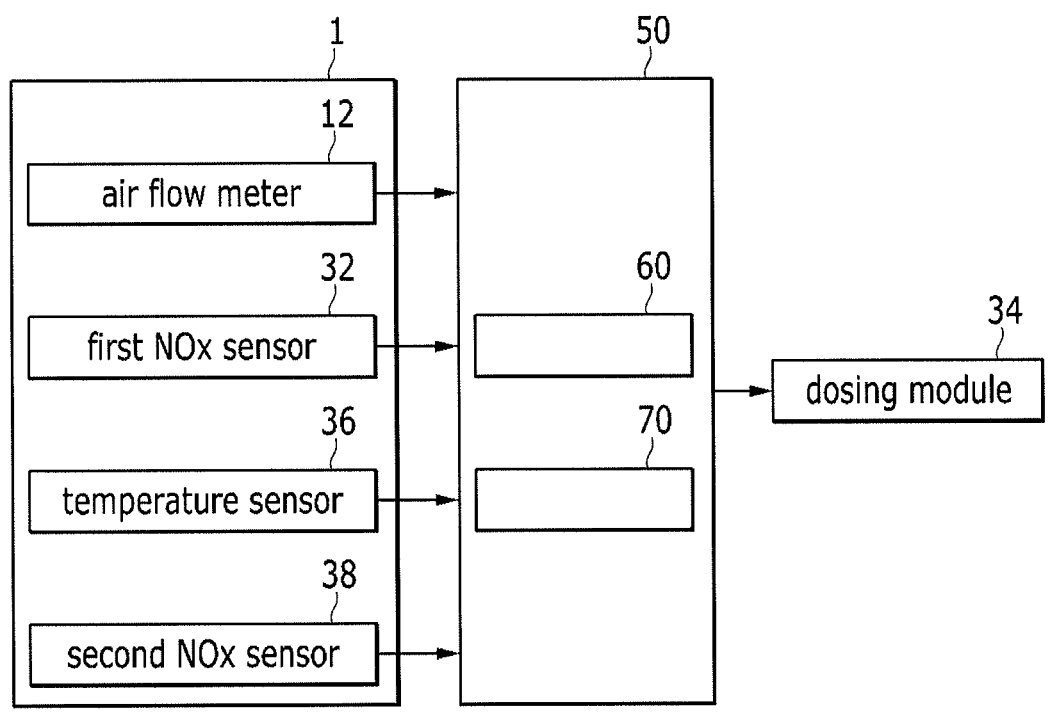
FIG. 2 is a block diagram illustrating a relationship of an input and output of a controller of an exhaust system to which an exemplary embodiment of the present invention can be applied.

FIG. 2 is a block diagram illustrating a relationship of an input and output of a controller of an exhaust system to which an exemplary embodiment of the present invention can be applied.

As shown in FIG. 2, the input variables detected by an input variable detector 1 is transmitted to the controller 50, and the controller 50 controls the dosing module 34 based on the input variables. The input variable detector 1 includes the air flow meter 12, the first NOx sensor 32, the temperature sensor 36 and the second NOx sensor 38.

The air flow meter 12 detects the flow rate of the air passing through the intake pipe 10 and transmits a signal corresponding thereto to the controller 50. The controller 50 may determine the exhaust flow rate based on the flow rate of the air.

The first NOx sensor 32 detects the NOx concentration contained in the exhaust gas at the upstream of the SCR catalyst 40 and transmits a signal corresponding thereto to the controller 50.

The temperature sensor 36 detects the temperature of the SCR catalyst 40 and transmits a signal corresponding thereto to the controller 50.

The second NOx sensor 38 detects the NOx concentration contained in the exhaust gas at the downstream of the SCR catalyst 40 and transmits a signal corresponding thereto to the controller 50.

The controller 50 determines the target injection amount of the reducing agent by substituting the exhaust flow rate, the NOx concentration contained in the exhaust gas at the upstream of the SCR catalyst 40, the injection amount of the reducing agent and the temperature of the SCR catalyst 40 into the reacting model 60, and controls the dosing module 34 according to the target injection amount of the reducing agent.

The controller 50 predicts the NOx concentration contained in the exhaust gas at the downstream of the SCR catalyst 40 by substituting the exhaust flow rate, the NOx concentration contained in the exhaust gas at the upstream of the SCR catalyst 40, the injection amount of the reducing agent and the temperature of the SCR catalyst 40 into the reacting model 60. In addition, the controller 50 determines the error between the predicted NOx concentration and the NOx concentration detected by the second NOx sensor 38.

Furthermore, the controller 50 determines the correction coefficient for correcting the parameters by substituting the error, the exhaust flow rate, the NOx concentration contained in the exhaust gas at the upstream of the SCR catalyst 40 and the temperature of the SCR catalyst 40 into the correcting logic 70, and corrects the parameters according to the correction coefficient.

The controller 50 can be realized by one or more processors activated by a predetermined program, and the predetermined program can be programmed to perform each step of a method of determining suitability of correction for a control logic of an SCR catalyst according to an exemplary embodiment of the present invention.

Meanwhile, the controller 50 may include a memory. The reacting model 60 and the correcting logic 70 may be stored in the memory. In addition, an error, a suitability coefficient and the number of corrections may be stored in the memory. In addition, the memory may be a non-volatile memory.

Figure 3:
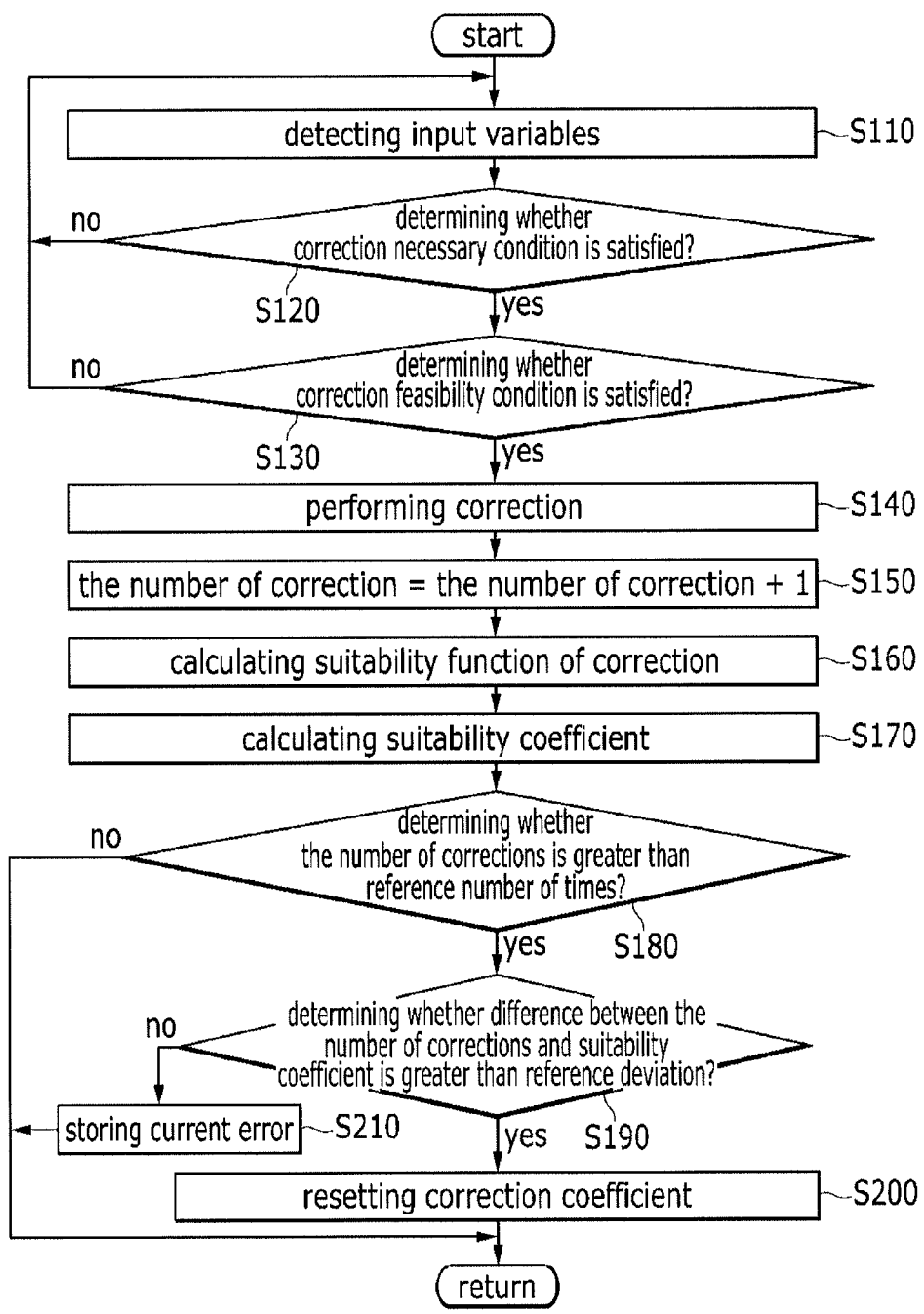
FIG. 3 is a flowchart of a method of determining suitability of correction for a control logic of an SCR catalyst according to an exemplary embodiment of the present invention.

FIG. 3 is a flowchart of a method of determining suitability of correction for a control logic of an SCR catalyst according to an exemplary embodiment of the present invention.

As shown in FIG. 3, a method of determining suitability of correction for a control logic of an SCR catalyst begins with detecting the input variables at step S110. The input variables may include the exhaust flow rate, the NOx concentration contained in the exhaust gas at the upstream of the SCR catalyst 40, the injection amount of the reducing agent and the temperature of the SCR catalyst 40.

If the input variables are detected, the controller 50 determines whether a correction necessary condition is satisfied at step S120. The correction necessary condition is satisfied if the error between the predicted NOx concentration and the NOx concentration detected by the second NOx sensor 38 is greater than a predetermined value under current input variables. The predetermined value may be set as a suitable value to a person of an ordinary skill in the art.

If the correction necessary condition is not satisfied at the step S120, the method returns to the step S110.

If the correction necessary condition is satisfied at the step S120, the controller 50 determines whether a correction feasibility condition is satisfied at step S130. The correction feasibility condition is satisfied if current temperature of the SCR catalyst 40 exists within a predetermined temperature range and current exhaust flow rate exists within a predetermined range of the exhaust flow rate. For example, if the temperature of the SCR catalyst 40 is too low or the exhaust flow rate is too small, the NOx concentration predicted by the reacting model 60 may be meaningless. If the parameters are corrected based on the meaningless value, reliability of correction may be low and unnecessary correction may be iterated. Therefore, the correction is performed only when the reaction of the SCR catalyst 40 predicted through the reacting model 60 can indicate the reaction occurring actually in the SCR catalyst 40.

If the correction feasibility condition is not satisfied at the step S130, the method returns to the step S110.

If the correction feasibility condition is satisfied at the step S130, the controller 50 corrects the control logic at step S140. For example, the correction coefficient is determined by inputting the error and the input variables into the correcting logic 70, and a plurality of parameters defining the control logic may be corrected according to the correction coefficient.

In addition, if the controller 50 performs the correction, the number of corrections is countered at step S150. That is, the current number of corrections is determined by adding 1 to the previous number of corrections.

After that, the controller 50 determines a suitability function of the correction at step S160. The suitability function of the correction is determined based on a previous error (the error determined after previous correction) and a current error (the error determined after current correction). For example, if the current error is smaller than the previous error, the suitability function of the correction may be 1. In addition, if the current error is greater than the previous error, the suitability function of the correction may be −1. The suitability function of the correction may be a value between −1 and 1.

If the suitability function of the correction is determined at the step S160, the controller 50 determines a suitability coefficient at step S170. The suitability coefficient is determined by adding the suitability function of the correction into the previous suitability coefficient.

After that, the controller determines whether the number of corrections is greater than a reference number of times at step S180. When the corrections are performed a few times, the control logic is prevented from being corrected due to unsatisfactory correction results. In addition, suitability is determined only if the corrections are performed reference number of times such that reliability of suitability determination can be secured.

If the number of corrections is smaller than or equal to the reference number of times at the step S180, the method returns to the step S110.

If the number of correction is greater than the reference number of times at the step S180, the controller 50 determines whether a difference between the number of corrections and the suitability coefficient is greater than a reference deviation at step S190.

If the difference between the number of corrections and the suitability coefficient is smaller than or equal to the reference deviation at the step S190, it is determined that the correction is suitable and the current error is stored at step S210. After that, the method returns to the step S110.

If the difference between the number of corrections and the suitability coefficient is greater than the reference deviation at the step S190, it is determined that the correction is not suitable and the correction coefficient is reset at step S200. For example, the parameters defining the reaction model 60 may be reset to default values. After that, the method returns to the step S110.

Figure 4:
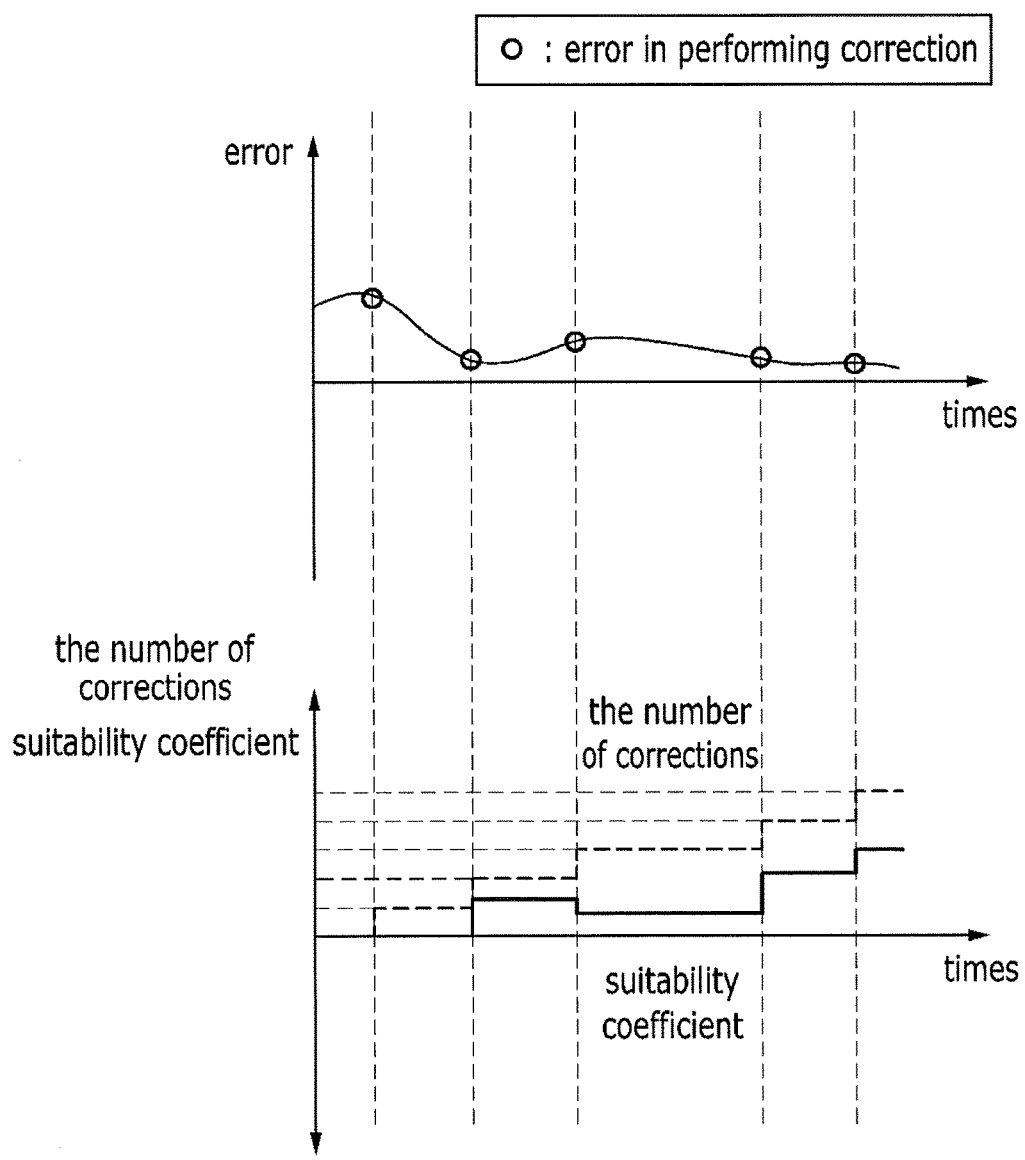
FIG. 4 is a graph illustrating a suitability coefficient and the number of corrections when the correction is suitable.
Figure 5:
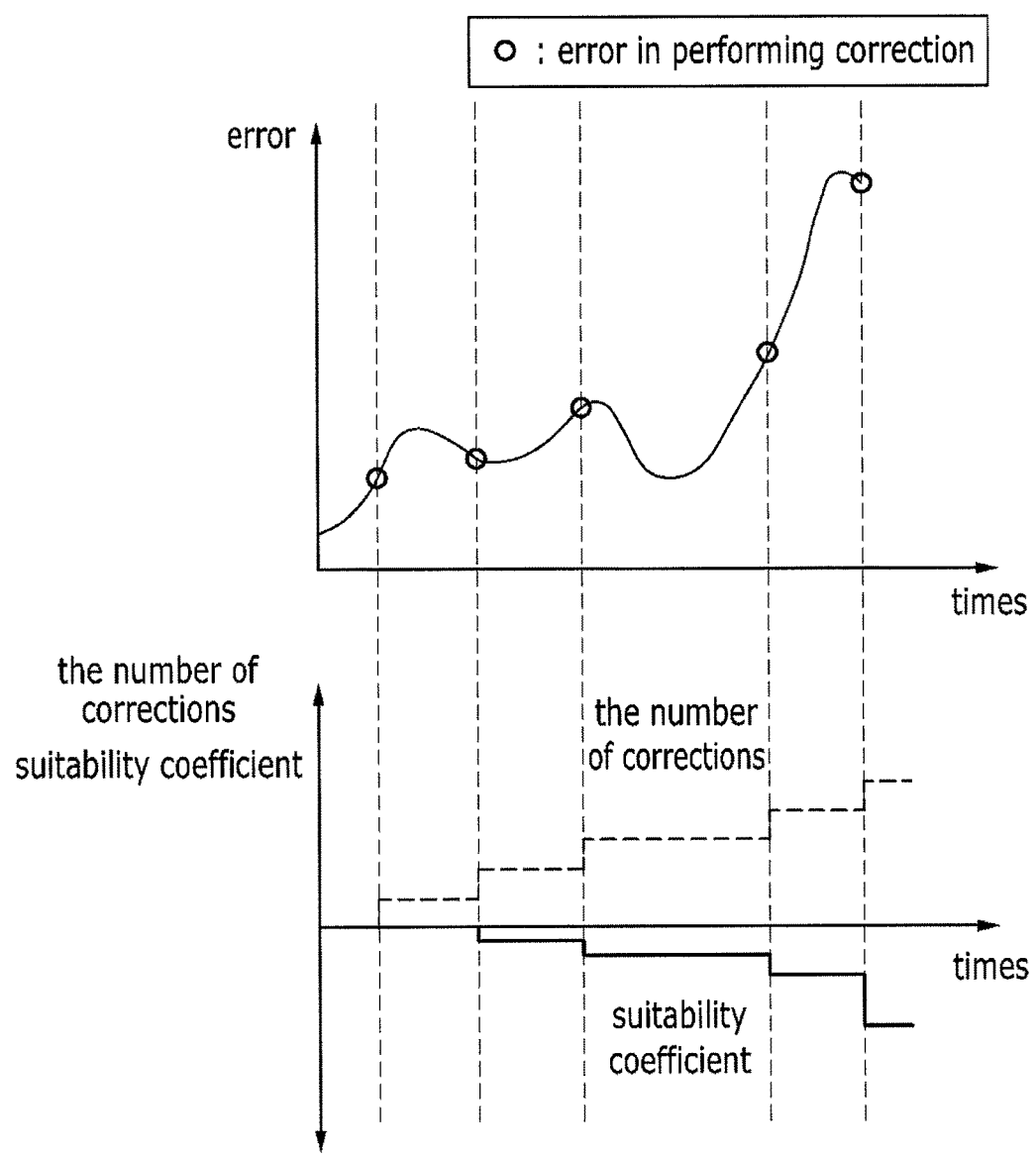
FIG. 5 is a graph illustrating a suitability coefficient and the number of corrections when the correction is not suitable.

FIG. 4 is a graph illustrating a suitability coefficient and the number of corrections when the correction is suitable, and FIG. 5 is a graph illustrating a suitability coefficient and the number of corrections if the correction is not suitable. A dotted line indicates the number of corrections and a solid line indicates the suitability coefficient in FIG. 4 and FIG. 5.

Referring to FIG. 4, as the corrections are performed, the number of corrections gradually increases from 1 to 5. The suitability coefficient increases when the second correction (because the error when the second correction is smaller than the error when the first correction), and decreases when the third correction (because the error when the third correction is greater than the error when the second correction). After that, as the corrections are performed, the suitability coefficient increases continuously since the error decreases. Therefore, the difference between the number of corrections and the suitability coefficient is small. In this case, it is determined that the correction is suitable.

Referring to FIG. 5, as the corrections are performed, the number of corrections gradually increases from 1 to 5. However, as the corrections are performed, the suitability coefficient decreases since the error increases. Therefore, if the number of corrections is greater than a predetermined number of times, the difference between the number of corrections and the suitability coefficient is greater than the reference deviation. In this case, it is determined that the correction is not suitable and the correction coefficient is reset.

As described above, reliability of correction is secured according to an exemplary embodiment of the present invention since it is determined whether the correction is suitable.

In addition, since the parameters of the control logic is reset to the default values if the correction is not suitable, the suitability of the corrections may be recovered quickly.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A method of determining suitability of correction for a control logic of a selective catalytic reduction (SCR) catalyst, comprising:
   determining, by a controller, a suitability function of the correction based on a previous error and a current error when the correction has been performed;
   determining, by the controller, a suitability coefficient based on the suitability function of the correction;
   determining, by the controller, whether the correction is suitable based on the number of corrections and the suitability coefficient; and
   resetting, by the controller, the control logic of the controller, when the correction is not suitable,
   wherein injection of reducing agent is controlled by the controller according to the reset control logic.

2. The method of claim 1, wherein the determining whether the correction is suitable is performed when the number of corrections is greater than a reference number of times.

3. The method of claim 1, wherein the correction is suitable when a difference between the number of corrections and the suitability coefficient is greater than a reference deviation.

4. The method of claim 1, wherein the suitability function of the correction is a value between −1 and 1.

5. The method of claim 1, wherein the suitability coefficient is determined by adding the suitability function of the correction into a previous suitability coefficient.

6. The method of claim 1, wherein, when the correction is suitable, further comprising storing the current error.

7. A system of determining suitability of correction for a control logic of a selective catalytic reduction (SCR) catalyst, the system comprising:
   the control logic determining injection amount of reducing agent for the SCR catalyst; and
   a controller controlling injection of the reducing agent according to the injection amount of the reducing agent at the least,
   wherein the controller is programmed to determine a suitability function of the correction based on a previous error and a current error when the correction has been performed, to determine a suitability coefficient based on the suitability function of the correction, to determine whether the correction is suitable based on the number of corrections and the suitability coefficient, and to reset the control logic when the correction is not suitable,
   wherein injection of reducing agent is configured to be controlled according to the reset control logic.

8. The system of claim 7, wherein the controller is programmed to determine whether the correction is suitable when the number of corrections is greater than a reference number of times.

9. The system of claim 7, wherein the controller is configured to that the correction is suitable when a difference between the number of correction and the suitability coefficient is greater than a reference deviation.

10. The system of claim 7, wherein the suitability function of the correction is a value between −1 and 1.

11. The system of claim 7, wherein the suitability coefficient is configured to be determined by adding the suitability function of the correction into a previous suitability coefficient.

12. The system of claim 7, wherein the controller is programmed to store the current error when the correction is suitable.

* * * * *